United States Patent [19]
Yokota

[11] Patent Number: 4,909,430
[45] Date of Patent: Mar. 20, 1990

[54] REFLOW SOLDERING METHOD AND THE APPARATUS THEREOF

[75] Inventor: Yatsuharu Yokota, Hachioji, Japan

[73] Assignee: Eightic Tectron Co., Ltd., Tokyo, Japan

[21] Appl. No.: 312,715

[22] Filed: Feb. 21, 1989

[30] Foreign Application Priority Data

Feb. 23, 1988 [JP] Japan ................................. 63-41095

[51] Int. Cl.⁴ ......................... B23K 3/00; B23K 31/02
[52] U.S. Cl. .................... 228/102; 228/180.2; 228/232; 228/240; 228/20; 228/21; 219/388; 219/396; 219/400; 219/85.17
[58] Field of Search ................. 228/102, 180.2, 180.1, 228/232, 240, 20, 21; 219/85 E, 388, 396, 400

[56] References Cited

U.S. PATENT DOCUMENTS

| | | | |
|---|---|---|---|
| 3,515,330 | 6/1970 | Bronson et al. | 228/20 |
| 3,769,675 | 11/1973 | Chartet | 228/232 |
| 3,882,596 | 5/1975 | Kendziora et al. | 228/232 |
| 4,648,547 | 3/1987 | Mahler et al. | 228/20 R |
| 4,771,929 | 9/1988 | Bahr et al. | 219/85 E |

Primary Examiner—Richard K. Seidel
Assistant Examiner—Samuel M. Heinrich
Attorney, Agent, or Firm—Robert F. Ziems

[57] ABSTRACT

A reflow soldering method and the apparatus thereof is disclosed, wherein an air flowing fan is provided at the bottom of the apparatus, that is, below a work transporting conveyor so as to produce a minus pressure to draw or pull air into the apparatus in a manner that the drawn air may flow in a constant volume and at a constant speed from up to down through a predetermined path and flow down through a heater provided in the path to be heated up substantially to a set temperature of the heater. The heated air further flows down to contact a work such as a base board having electronic parts mounted thereon and transported by the conveyor and heat up the work. The air is then sent out of the above mentioned air circulating path by the fan into a another path which allows the air to flow from down to up into an air chamber located above the heater, the air chamber is of a sufficient capacity to remarkably reduce the flowing speed of the air to stagnate the same therein for preparation of the next air circulation through the above mentioned air circulating paths to heat up the work as the latter is transported by the conveyor.

10 Claims, 10 Drawing Sheets

REFLOW SOLDERING METHOD AND THE APPARATUS THEREOF

BACKGROUND OF THE INVENTION

The invention relates to a reflow soldering method and the apparatus thereof and more particularly relates to such method and the apparatus thereof wherein an air flowing fan is placed below a work transporting conveyer to draw or pull air into the apparatus from up to down toward a heater by means of a minus pressure produced by the fan so as to make constant the temperature of heated air, the flowing speed and volume thereof, and simultaneously to reduce the height of the apparatus as compared with a conventional reflow soldering apparatus. Further according to the invention, a mechanism for driving the fan is located at a specific place where there is little influence of air heating temperature so as to increase the endurance of the mechanism and to reduce the vibration and noise of the mechanism.

It is generally known that the reflow soldering apparatus requires no solder fusing tank, but is designed to progressively preheat a base board having electronic parts attached thereto by means of a paste like cream solder and transported to a heater by a conveyer and to heat the base board up to a soldering temperature of more than 230° C. in a short time at the final process so as to fuse the cream solder to thereby solder the electronic parts to the base board.

According to the conventional reflow soldering apparatus, an electric heater is used to heat the base board by far region infrared rays radiated from the heater. In this case, it is required that the electric heater is set up to a temperature higher than a minimum temperature, that is, 150° C.–250° C. required to heat the the base board, because the heater heats up the base board spaced from the heater by nonmoving or stagnant air. The base board is therefore heated up to variable temperatures depending upon the speed of the conveyer transporting the base board relative to the heater. It is therefore necessary to control the speed of the conveyer in reference to a set temperature, up to which the base board is heated. In fact, it is difficult and troublesome to accomplish such speed and temperature control, because a most desired condition must be sought by repeated tests and checks each time a different type of base board is soldered.

In this connection, it is to be noted that the electronic parts mounted on the base board may each have a different heat capacity, and in dependence upon the heat capacity difference, there is a temperature difference of more than 50° C. which may break the electronic parts of smaller heat capacity, the QFP (Quat-Flat Package), PLCC (Plastic Leaded Chip Carrier) and the like which are sensitive to heat. Moreover the rapid temperature rise in the preheating process will give a strong heat shock to the base board and the electronic parts mounted thereon.

The above mentioned defects and disadvantages may be eliminated by the so called vapor phase method in which a special organic solvent is vaporized up to an optimum temperature, for example, about 250° C. which is maintained as the highest temperature which will not heat the base board up above the solder set temperature. Even this method may however destroy the base board and the electronic parts because the temperature of the vapor heat medium will rapidly rise in the preheating process of the base board.

Moreover the organic solvent used in the vapor phase method is very expensive and is consumed in the vaporization, and therefore the soldering cost is very high. Further in this vapor phase method the temperature of the base board may be raised easily, but the temperature of the heated base board after the soldering process is not easily dropped in the subsequent cooling process. This is because the vapor of the organic solvent attached to the base board remains at a temperature slightly lower than the soldering temperature and because the vapor has a heat capacity remarkably larger than that of the air. Further the organic solvent is poisonous so that care must be taken in its employment.

Figure 11:
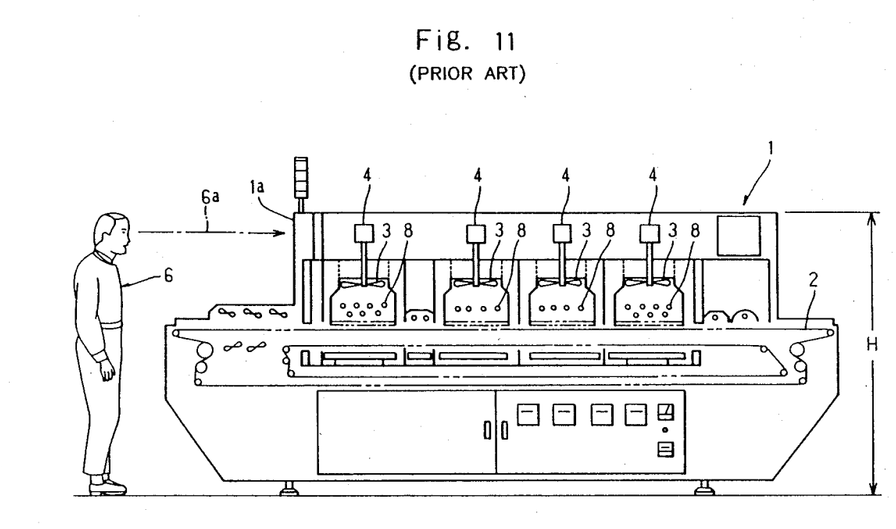
FIG. 11 is a side elevational view of a conventional reflow soldering apparatus shown in vertical section in relation to an operator thereof.

The applicant has developed a reflow soldering method and apparatus thereof employing a new air circulating system for eliminating the defects and disadvantages of the prior art as mentioned above. The inventions in connection with the mentioned method and the apparatus thereof have been filed in Japan as patent applications No. 62-12071 and No. 62-115456. However these inventions and the invention as seen in FIG. 11 showing a conventional reflow soldering apparatus 1, a plurality of air flowing fans 3 and fan driving motors 4 are additionally provided above a work transporting conveyer 2 resulting in increasing the height H of the apparatus, the height H being about 1.55m or more than that. Therefore if the operator 6 is less than 1.55m tall, his sight 6a is lower than the apparatus 1 and is blocked by the upper hood 1a of the apparatus 1, and he cannot see the objects beyond the apparatus in the factory. Actually an operator of taller than 1.75m can see the objects beyond the apparatus, but cannot see the objects of less than 1.55m tall located or existing beyond the apparatus. This will detract from the supervisory control of the factory.

Further according to the conventional apparatus, the fans 3, the electric motors 4 and other mechanisms in connection therewith are arranged above heaters 8. These members are therefore all exposed to a high temperature of the air coming up as the air is heated by the heater. This will shorten the life of these members. Moreover these members located at the upper portion of the apparatus will give rise to vibrations and noises.

Further according to the conventional apparatus, the fans 3 located above the heaters 8 will be driven to push the air against the heaters by means of an increased pressure. This will however fail to make the air flow constant over the faces of the heaters resulting in variable temperature distribution of the heated air.

OBJECTS OF THE INVENTION

The present invention has been provided to eliminate the defects and disadvantages of prior art, and it is an object of the invention to circulate the air by means of a fan with a specific speed, for example, 3m/sec to bring the air into contact with a heater to heat the same and then to bring the heated air into contact with a base board having electronic parts mounted thereon so that the base board may be progressively saturated in temperature with the temperature of the heated air to thereby prevent a radical temperature rise of the base board, that is, to prevent heat shock of the base board and the electronic parts which are sensitive to heat such as afforementioned QFP, PLCC, FIC (Flat IC) chips, SMD (Surface Mounted Device) and the like. It is another object of the invention to make extremely high the precision of the temperature rise of the base board, for example, about ±2° C. It is another object of the invention to heat the base board and electronic parts of different heat capacities with a constant temperature distribution in much the same way as it is done in the vapor phase method. It is another object of the invention to dispense with an expensive heat medium, which is required in the vapor phase method, to reduce the soldering cost. It is another object of the invention to constantly heat all parts of the base board so that the base board may be soldered with a lowest possible constant temperature to thereby reduce the adverse heat influence to the base board and the electronic parts mounted thereon. It is another object of the invention to place the air flowing fan below the work transporting conveyer to thereby reduce the height of the reflow soldering apparatus by at least 20 cm as compared with the conventional apparatus as shown in FIG. 11, that is, to reduce the height of the apparatus to less than 1.35m. As the result, the operator of the apparatus can see the objects and workers beyond the apparatus in the factory under supervisory and safety control. It is another object of the invention to place the air flowing fan below the work transporting conveyer so as to free the fan and the fan driving mechanism from the influence of heat generated by the heater to thereby secure the endurance of the fan and the fan driving mechanism, and further to reduce the vibrations and noises which otherwise maybe produced by the fan and the fan driving mechanism including an electric motor and the transmission device thereof. It is another object of the invention to place the fan below the work transporting conveyer to cause the air to flow from up to down in the apparatus, that is, to flow down through an air circulating channel in which the heater is arranged to heat the air and then to flow up through another air circulating channel to above the heater. Namely the air is pulled or drawn into the apparatus toward the heater by means of a minus or negative pressure generated by the fan. As the result, the air flowing speed and the air volume may be constant over the entire surface of the heater in contrast to the conventional apparatus in which the air is pushed toward the heater, and therefore the temperature distribution becomes constant over the entire heater resulting in constantly heating all parts of the base board. It is another object of the invention to provide an air chamber of a large capacity above the heater so as to reduce the speed of the air circulating up and stagnate the air therein so that the air may flow into the heater with a constant volume to thereby make constant the temperature distribution over the entire heater to constantly heat all parts of the base board.

It is still another object of the invention to use a panel heater having many through-holes formed therein which will produce the effect of constant temperature distribution and a fin heater of bigger heating ability. The fin heater is employed in the initial preheating zone and the soldering zone of the apparatus and the panel heater is employed in the median and last preheating zones so as to rapidly preheat the base board up to a predetermined temperature in the initial preheating zone and then to secure the constant temperature distribution in the following preheating zones and finally rapidly heat the base board to solder the same in the soldering zone.

SUMMARY OF THE INVENTION

In short, the invention relates to a reflow soldering method for a base board to be soldered wherein the air is circulated by a fan to flow through a heater so as to be heated and then come into contact with the top of the board having electronic parts mounted thereon and being transported by a conveyer relative to the heated air, and comprises the steps of: (a) producing a minus pressure by means of a fan placed below said conveyer to cause the air to flow from up to down through a predetermined path; (b) causing the down flowing air to pass through the heater to heat the air; (c) contacting the heated down flowing air to the base board as the base board is transported relative to the air; and (d) causing the heated air to flow from down to up to circulate the air relative to the heater and the base board.

Another aspect of the invention further comprises the step of: reducing the flowing speed of the air when the up flowing air reaches a point above the heater.

The invention further relates to a reflow soldering apparatus for soldering a base board having electronic parts mounted thereon, wherein the air is caused to flow to be heated and contacted to the base board which is transported by a conveyer, and comprises: (a) air flowing means including a fan provided below said conveyer and driven to cause the air to flow from up to down past said conveyer; (b) air heating means including a heater provided above said conveyer to heat the air when the air flows through said heater; and (c) air circulating means including a first air circulating channel for allowing the air to flow from up to down through said heater and past said base board as the latter is transported by said conveyer and at least one second air circulating channel which is conductive with said first air circulating channel and allows the air to flow from down to up to a level above said heater.

Another aspect of the invention further comprises an air chamber located above said heater, said air chamber having a capacity for remarkably reducing the flowing speed of the air to stagnate the air therein.

Another aspect of the invention is that a panel heater is composed of a plurality of electric heater members arranged in parallel with each other with a predetermined space provided therebetween and a pair of metal plates of excellent heat conduction sandwiching said electric heater members from the upper and lower sides thereof, said metal plates having a plurality of vertical holes provided therethrough for allowing the air to flow through said holes to make a heat exchange.

Another aspect of the invention is that the metal plates are made of aluminum.

Another aspect of the invention is that a fin heater is composed of a plurality of electric heater members arranged in parallel with each other with a predetermined space provided therebetween, each of said electric heater members having a pair of metal plates of excellent heat conduction arranged thereagainst in a sandwiching manner from both sides thereof, each of said metal plates having a plurality of fins of excellent heat conduction provided on one side thereof with a predetermined space provided therebetween for allowing the air to flow through the heater from up to down.

Another aspect of the invention further comprises a plurality of air heating devices arranged in series, each of which is independent from the others and is composed of said fan, said first and second air circulating channels, said heater, said conveyer, and said air chamber, at least one of said air heating devices being provided with a fin heater to thereby constitute an initial zone for preheating said base board and at least one of said air heating devices being provided with a fin heater to thereby constitute a zone for soldering said base board, the others of said air heating devices being provided with panel heaters to constitute medium and last zones for preheating said base board.

Another aspect of the invention further comprises a driving device including an electric motor for driving said fan and a transmission mechanism arranged between said electric motor and said fan, said driving device being placed below said conveyer.

Still another aspect of the invention is that the apparatus is designed to be less than 1.35m tall.

DETAILED DESCRIPTION OF THE INVENTION

The invention is explained in reference to a preferred embodiment as shown in the drawings. Now in reference to FIGS. 1–4, a reflow soldering apparatus 11 is provided with a plurality of fans 12, a plurality of air circulating channels 13, a plurality of heaters 14, and a work transporting conveyer 15, which are arranged in association with each other respectively. The fan 12 is placed under the conveyer 15 and the heater 14 is placed above the conveyer 15. The air circulating channel 13 is composed of a channel 13D and other channels 13U. The channel 13D is designed to allow the air to flow down therethrough as the air is pulled or drawn into the channel 13D by the fan 12 so that the air heated by the heater 14 may contact a base board 16. The channels 13U are designed to allow the air to flow up to a location above the heater 14 as the air is sent out of the fan 12.

An air chamber 18 is provided above the heater 14. The chamber is of such a capacity as to increase the space of the air flowing up through the channels 13U so that the air may be stagnated therein.

Figure 4:
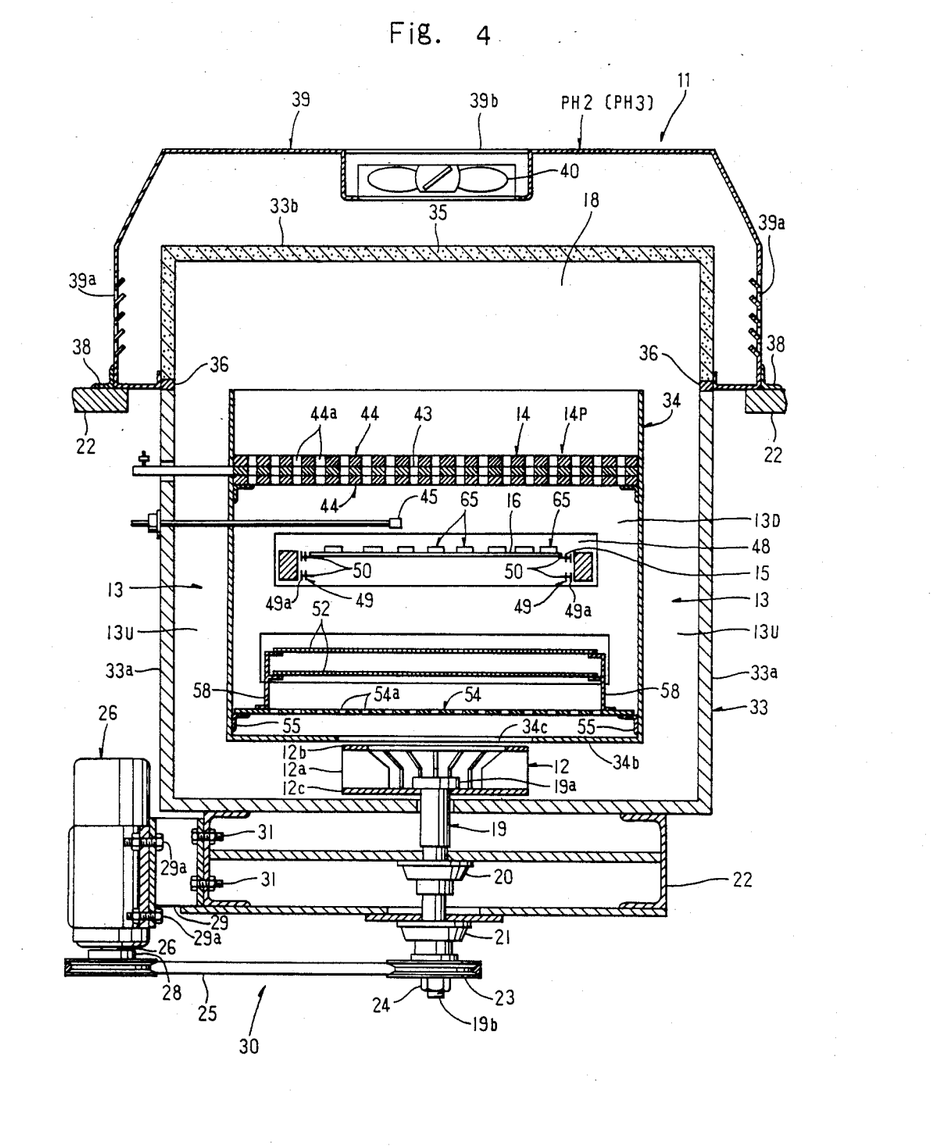
FIG. 4 is a front elevational view of the reflow soldering apparatus shown in vertical section taken along line IV—IV in FIG. 1, wherein the panel heater is provided.

The fan 12 is, as shown in FIG. 4, a warm air fan of centrifugal type having a plurality of blades 12a fixed to the upper and lower donut shaped plates 12b, 12c thereof, of which the lower donut shaped plate 12c is secured to a top 19a of a rotation shaft 19 which is journalled in a pair of bearings 20, 21 fixedly mounted on a base 22 of the soldering apparatus 11.

The rotation shaft 19 has a pulley 23 secured to the lower end 19b by means of a nut 24. The pulley 23 is connected by a V-shaped belt 25 to a pulley 28 secured to a rotation shaft 26a of an electric motor 26 for driving the fan 12. The electric motor 26 is secured by bolts 29a to a bracket 29 which is secured to the base 22 by bolts 31.

Figure 9:
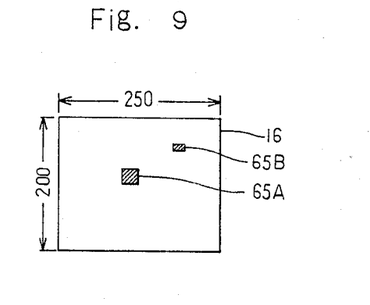
FIG. 9 is a plan view of base boards for testing samples.

In this manner, the fan 12 and the fan driving mechanism 30 are located under at the lowest position of the apparatus, that is, under the heater 14 and the conveyer 15, where the fan 12 and the fan driving mechanism 30 are little affected by the heating temperature in the apparatus 11. The electric motor 26 is provided on the right side of the transporting direction of the conveyer 15, that is, on the rear side of the reflow soldering apparatus 11 as shown in FIG. 9.

The air circulating channel 13 is provided in each of heating devices PH1, PH2, PH3 and SH, and is formed on both sides of the work transporting direction as indicated by an arrow mark K. More precisely the air circulating channel 13 is formed by an outer casing 33 and an inner casing 34 which are designed to form each of the heating devices PH1, PH2, PH3 and SH, thus providing the channels 13U of a same area on both sides of the work transporting direction for up circulation of the air. The outer casing 33 is made of a heat isolating material and the inner casing 34 is made of a steel plate and the like.

Figure 3:
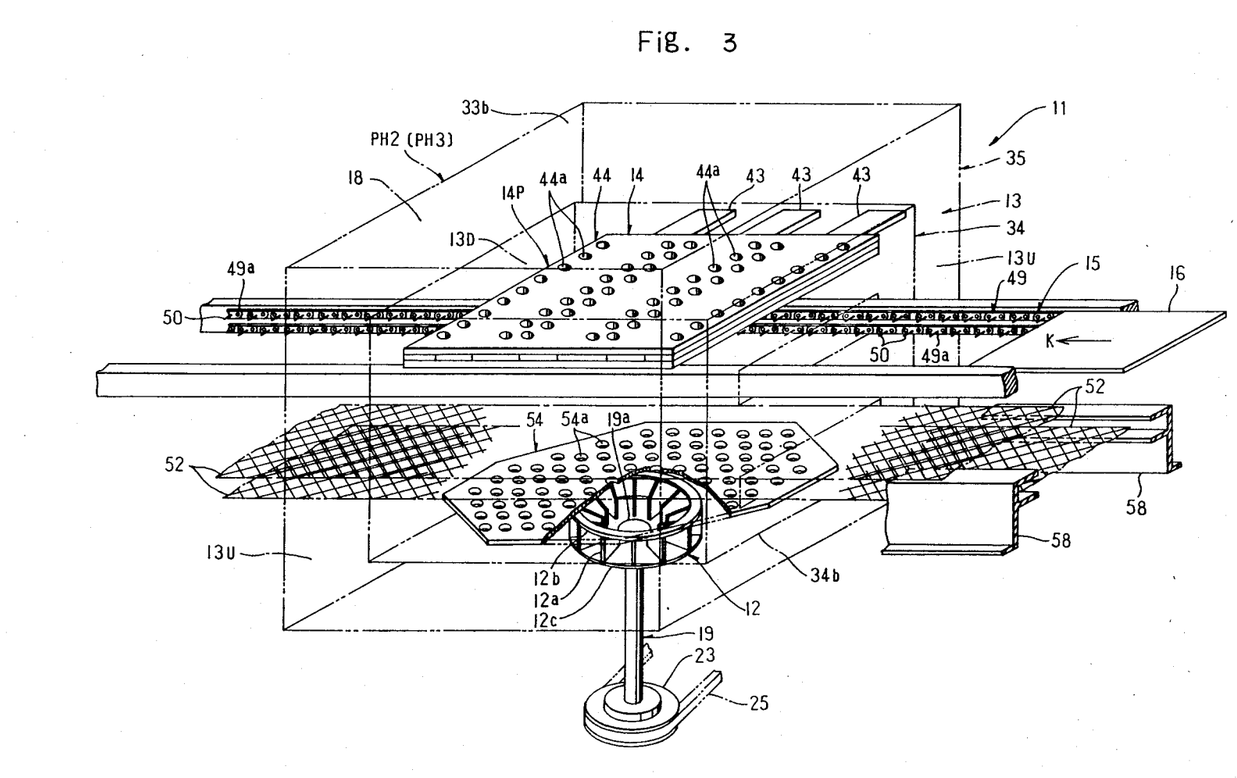
FIG. 3 is a perspective view of the reflow soldering apparatus shown partly in section and having a panel heater provided therewith.

As particularly shown in FIGS. 3 and 4, the air circulating channel 13 is formed in the horizontal plane around the fan 12 and extends up with up-standing parts 33a of the outer casing 33 into the air chamber 18 which is designed to have a considerably large capacity, for example, of about 82l in the heating devices PH1 and SH and of about 110l in the heating devices PH2 and PH3.

The outer casing 33 has a ceiling 33b provided at the top thereof which is made of a heat isolating material 35 which is appropriately connected to the upstanding parts 33a by means of connecting members 36,36 and is further connected to an upper ventilation hood 39 which is secured to the base 22 by means of angle members 38,38. The ventilation hood 39 has a plurality of ventilation openings 39a formed on both sides thereof, that is, on both sides of the work transporting direction, and further has a ventilating fan 40 provided on the top thereof. The ventilating fan 40 is provided in each of the heating devices PH1, PH2, PH3 and SH to exhaust out the vapor, flux gas and the like of organic solvents which may be produced in the heating devices.

The heater 14 is provided in the air circulating channel 13 to heat the air as the air flows into the air circulating channel. In this embodiment, two types of heaters are employed.

The heater 14 as shown in FIGS. 3 and 4 is composed of electric heaters 43 arranged with a predetermined space provided therebetween and each of which is sandwiched from up and down by metal plates 44 of excellent heat conduction. The metal plates have a plurality of holes 44a provided therein in the direction of the thickness thereof so that the air may flow through the holes to make heat exchange. The heater 14 of this type will be called as a panel heater 14P herein. The heater 43 of this type is electrically connected to an outer power supply (not shown) so as to generate heat. A temperature sensor 45 is provided below the panel heater 14P and is located at about the center of the channel 13D for guiding the down-flowing air. The temperature sensor is connected to a computer (not shown).

Figure 2:
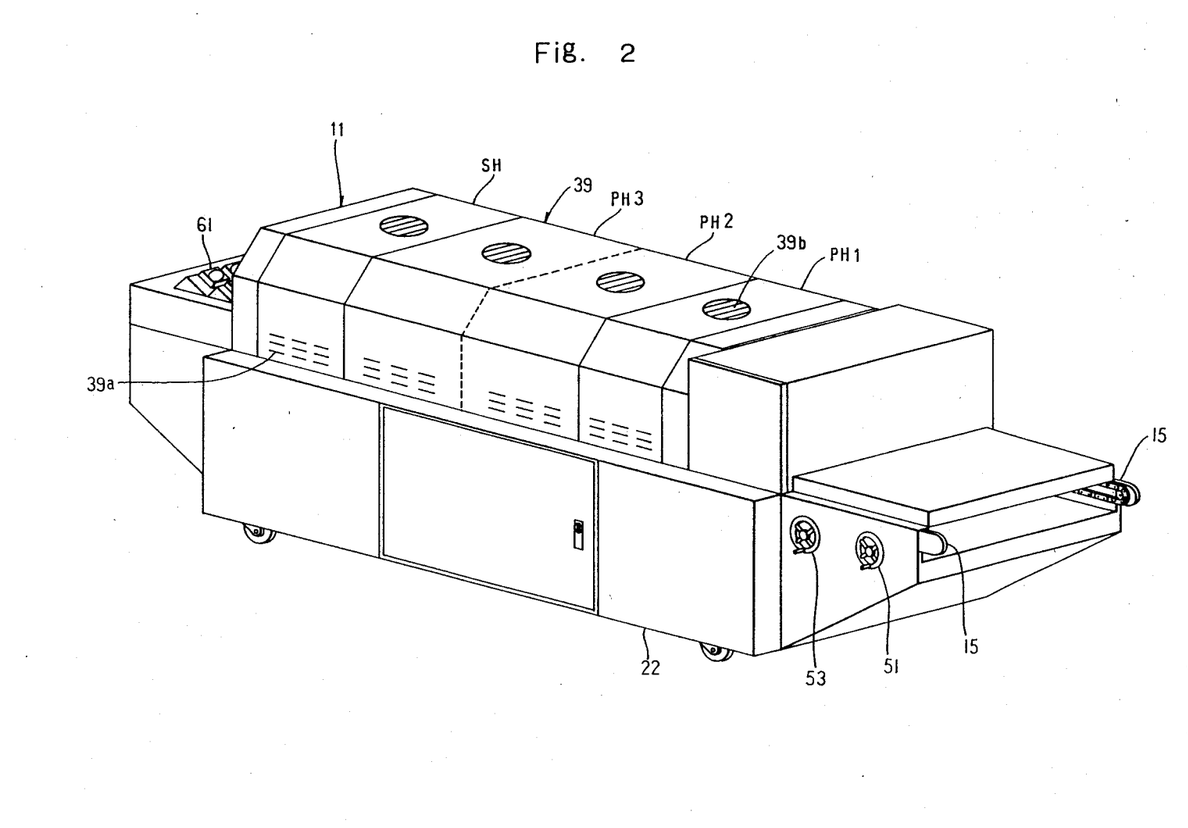
FIG. 2 is a perspective view of the reflow soldering apparatus.

Below the temperature sensor 45, there is provided the conveyer 15 constituting a path for transporting a work such as a base board 16. The conveyer 15 is composed of a pair of parallel endless chains 49 each has links 49a each of which having a pin 50 protruding therefrom to carry the base board 16. The width of the parallel endless chains 49 may be optionally varied by a handle 51 as shown in FIG. 2.

Another conveyer 52 is provided below the work transporting conveyer 15 for the purpose of carrying away the extras dropped from the base board 16 while the latter is treated in the preheating and soldering processes. The conveyer 52 is composed of a meshed endless chain which may be driven by manual operation of a rotation handle 53 as shown in FIG. 2.

An air rectifying plate 54 is provided below the extra carrying conveyer 52. The air rectifying plate 54 has a number of holes 54a formed therein for causing the air to flow down in a uniform quantity as the air is drawn down by the fan 12. The air flowing down through the air rectifying plate 54 is sent out into the channels 13U for guiding the air in the upper direction. The air rectifying plate 54 is secured to the inner casing 34 by means of angle members 55, and the extra carrying conveyer 52 is slidably mounted on a pair of brackets 58 secured to the air rectifying plate 54. The inner casing 34 has an opening 34c formed in the bottom 34b thereof. The opening 34c is of a diameter which is substantially the same as that of the fan 12 which is located in alignment with the opening 34c.

Figure 5:
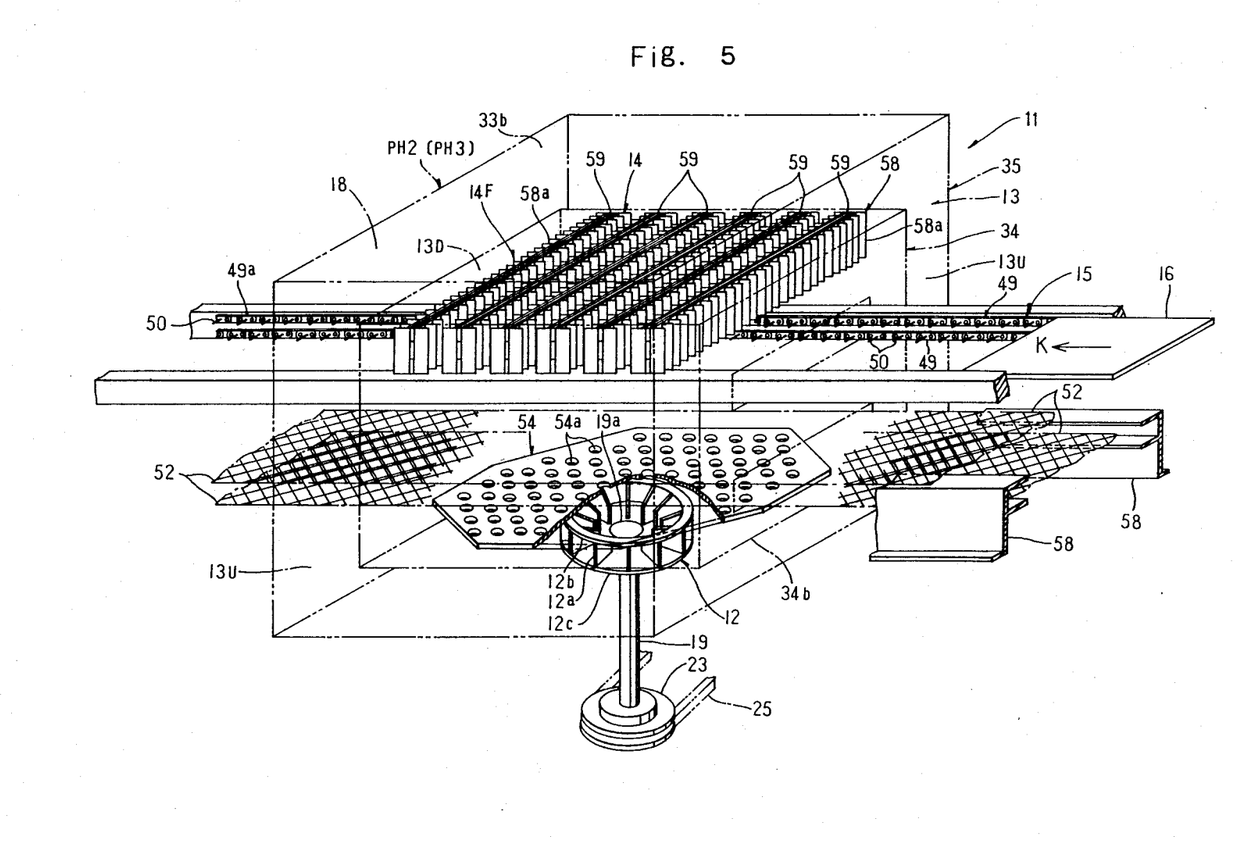
FIG. 5 is a perspective view of a heating device shown partly in section and having a fin heater provided therein.
Figure 6:
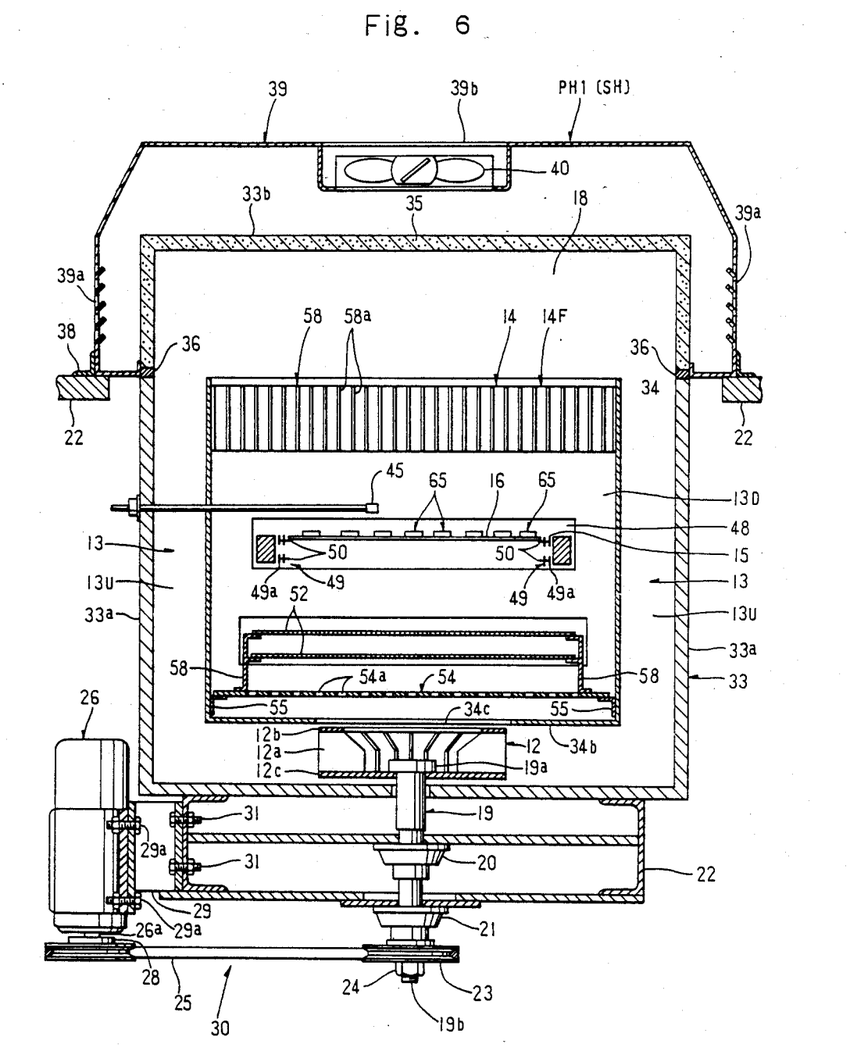
FIG. 6 is a front elevational view of the reflow soldering apparatus shown in vertical section taken along line VI—VI in FIG. 1, wherein the fin heater is provided.

In reference to FIGS. 5 and 6, the heater 14 of another type may be employed. The heater 14 is composed of a plurality of electric heaters 59 each of which is sandwiched from both sides thereof by a metal plate 58 of excellent heat conduction such as aluminum having a number of fins 58a so arranged as to cause the air to flow in the vertical direction and to increase the quantity of the air flowing therethrough and thereby to rapidly heat the work. The heater 14 of this type will be called a fin heater 14F hereinafter. According to the shown embodiment, 28 pieces of fins 58a constitute one row, and a pair of two rows are arranged in association with each of six electric heaters 59 extending traverse to in the work transporting direction, and thus the fin heater 14F is formed. The other parts in relation to the fin heater 14F are structured in the same manner as shown in FIGS. 3 and 4, and therefore the further explanation is omitted.

In reference to FIG. 1, the relation between the heater 14 and the heating devices PH1, PH2, PH3 and SH will be explained. The four heating devices PH1, PH2, PH3 and SH are independently formed, and each of which is provided with the fan 12, the air circulating channel 13, the heater 14, conveyer 15 and the air chamber 18. The heating devices PH1, PH2 and PH3 constitute a preheating zone PHZ and is further divided into initial, median and last preheating zones, and the heating device SH constitutes a soldering zone SHZ. According to the embodiment, the fin heater 14F is employed in the heating device PH1 constituting the initial preheating zone and in the heating device SH constituting the soldering zone SHZ, while the panel heater 14P is employed in the heating devices PH2 and PH3 constituting the median and last preheating zones respectively. This is for the purpose of rapidly heating the work in the initial zone of the preheating zone PHZ and uniformly heating the work in the median and last zones of the preheating zone PHZ and further rapidly heating the work in the soldering zone SHZ to fuse the cream solder (not shown) attached to the work such as the base board 16.

The reflow soldering apparatus 11 of the invention has the drive mechanism 30 for fan 12 including the bearings 20, 21 and the electric motor 26 provided below the conveyer 15 in each of the heating sections, and therefore the height H of the apparatus may be set to a dimension no more than 1.35m.

Figure 1:
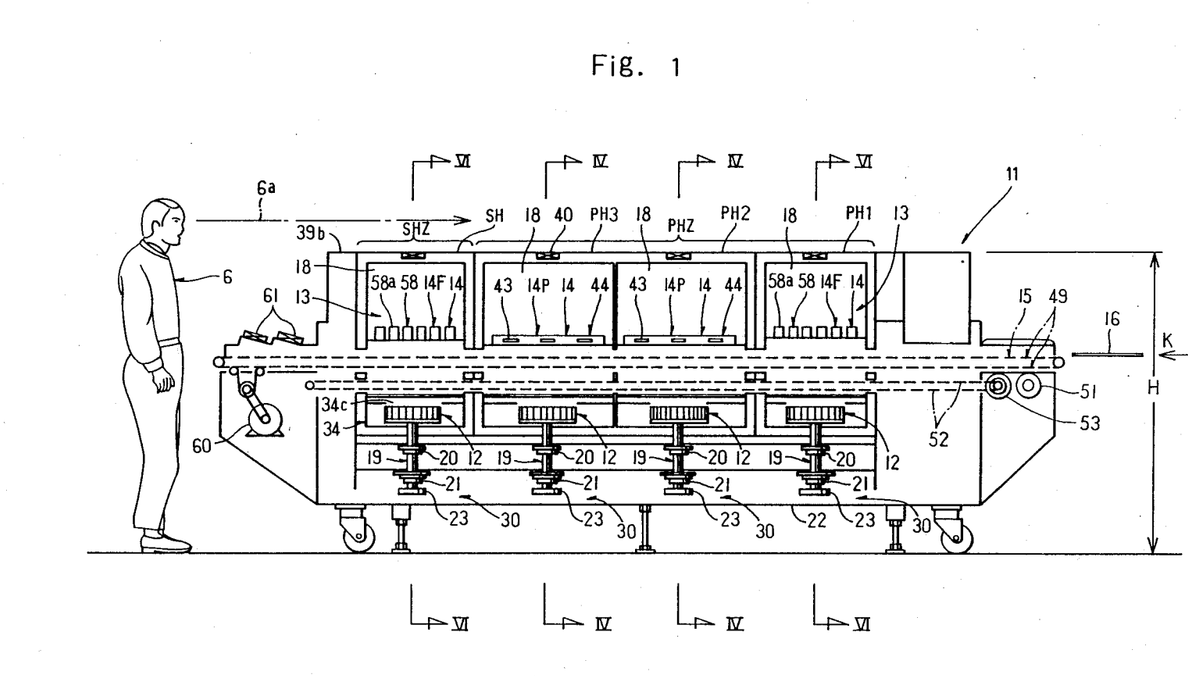
FIG. 1 is a side elevational view of a reflow soldering apparatus of the invention shown in vertical section in relation to an operator thereof.

Further in reference to FIG. 1, the apparatus 11 has a conveyer driving electric motor 60 and cooling fans 61 provided on one end thereof.

The air as mentioned above is not limited to natural atmospheric air composed of about 79% of nitrogen and about 21% of oxygen and other gases. The air may be the nitrogen gas only as the result of depriving the air of the oxygen and other gases. More precisely 99.9% of nitrogen and preferably 99.99% of nitrogen may be practically used. Such nitrogen gas may be a cylindered gas available on the market.

Figure 7:
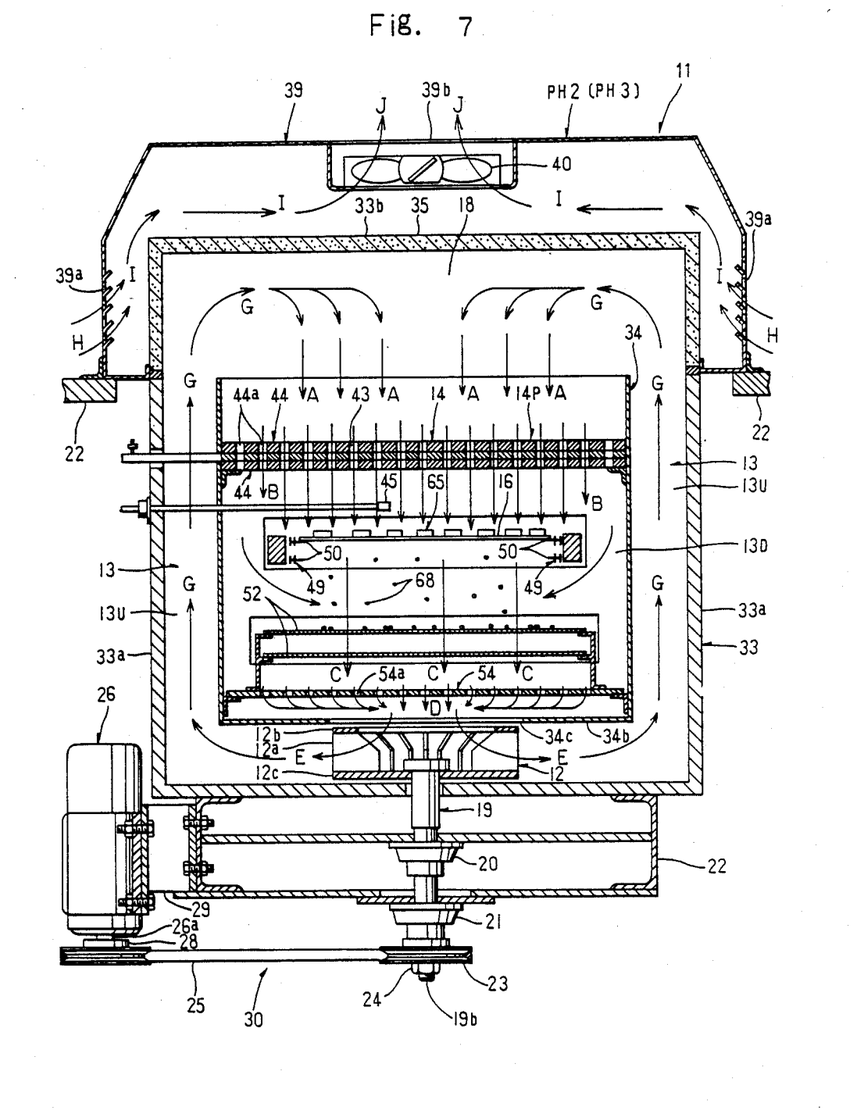
FIG. 7 is a vertically sectioned front elevational view of the reflow soldering apparatus showing the panel heater and the air flowing therethrough.
Figure 8:
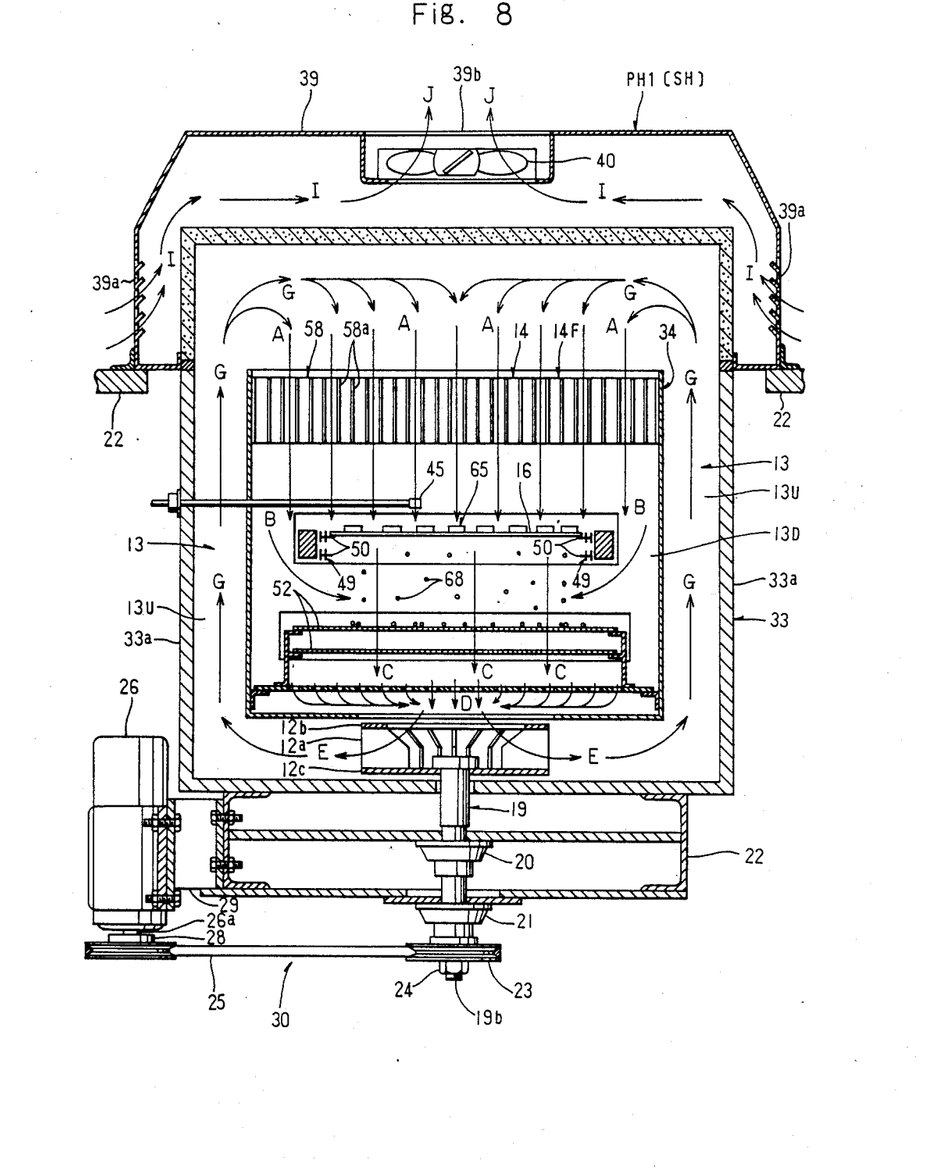
FIG. 8 is a vertically sectioned front elevational view of the reflow soldering apparatus showing the fin heater and the air flowing therethrough.

According to the reflow soldering apparatus, as shown in FIGS. 7 and 8, the fan 12 is driven to circulate the air to heat the same by means of the heater 14 and to contact the heated air to the base board 16 having electronic parts mounted thereon, wherein the fan 12 is arranged below the work transporting path 48 of the base board 16, so as to cause the air to circulate from up to down by means of the minus pressure generated by the fan 12 so that the air may pass through the heater 14 to be heated thereby and then contact the base board 16, and then the air is sent out of the fan 12 to be circulated in the upper direction. Further the speed of the air circulated in the upper direction is reduced in the air chamber 18 of a big capacity so that the air may be stagnated in the air chamber so as to be circulated down again.

The invention is structured as mentioned above, and the operation is as follows: In reference to FIG. 7 in which the panel heater 14P is employed in the heating device PH2 (PH3), the electric motor 26 is rotated to rotate the rotation shaft 19 of the fan 12 in one direction by way of the rotation shaft 26a of the motor, the pulley 28, the V-shaped belt 25 and the pulley 23, and then the fan 12 having the blades 12a is rotated at a high speed.

As the result, the pressure in the air circulating channel 13D is reduced in comparison with the atmospheric pressure, that is, a minus pressure is caused in the channel 13D, and therefore the air is caused to flow down from the air chamber 18 as shown by the arrow marks A into the air circulating channel 13D and flow down through the holes 44a of the panel heater 14P where the air is heated up to a high temperature with a heat exchange due to the metal plates 44 heated by the heaters 43. Then the heated air flows down as shown by the arrow marks B and contacts the base board 16 having the electronic parts 65 mounted thereon while the base board 16 is transported by the conveyer 15. Thus the base board 16 and the electronic parts are heated up.

In this case, it is noted that the air is drawn down into the air circulating channel 13D by means of the negative pressure generated by the fan arranged at the lower position in contrast to the prior art wherein the fan is arranged at an upper position such as to push the air into the heater by means of an increased pressure. Therefore according to the invention, the air is drawn down from the air chamber 18 in which the air is stagnated, and flows down through the heater 14 having a number of holes 44a formed therein. As the result, the air will constantly flow down in a uniform volume and with a uniform heat capacity onto the base board 16 and the electronic parts 65 mounted thereon within the air circulating channel 13D. Thus the base board 16 is wholly and uniformly heated.

Then as shown by the arrow marks C, the air flows down through the extra carrying conveyer 52 and then through the holes 54a of the air rectifying plate 54 and subsequently sent out as shown by the arrow marks E from the opening 34c formed in the bottom 34b of the inner casing 34 by the fan 12. The sent out air is then fed back up into the air chamber 18 as shown by the arrow marks G through the air circulating channels 13U provided on both sides of the inner casing 34.

In the meantime, the temperature sensor 45 detects the temperature of the air heated by the heater 14 and gives the detected effect to the computer, which is responsive to the detected effect to control the temperature of the electric heaters 43 as required, maintaining the temperature at the air preferably of about 150° C. in the preheating zone PHZ.

It is to be understood that it is difficult to obtain a sufficient total sectional area of the through-holes 44a so as to adequately heat the air passing through the holes 44a.

The metal plates 44 are however wholly heated up to a high temperature giving a radiant heat toward the base board 16 to uniformly heat up the same. This is the reason why the panel heater 14P is employed in the heating devices PH2 and PH3 constituting the median preheating zone and the last preheating zone respectively of the preheating zone PHZ. The extras 68 which may be dropped from the base board 16 during the treatment of the base board 16 in the preheating process are transported out of the apparatus 11 by the extra carrying conveyer 52 with rotating operation of the handle 53.

Further since the outer casing 33 is made of a heat isolating material, the heat of the heater 14 will scarcely escape out of the casing, and therefore a high heat efficiency is maintained. The gases of organic solvents and flux gas as shown by the arrow marks J will be exhausted out of the ventilation opening 39b into an outer duct (not shown) by the ventilation fan 40 as shown by the arrow marks I together with the air flowing into the hood 39 as shown by the arrow marks H.

In reference to FIG. 8 in which the fin heater 14F is employed in the heating devices PH1 and SH, similarly as in FIG. 7, the rotation of the fan 12 will cause the air in the air chamber 18 to flow down through the clearances of the heater 14F as shown by the arrow marks A and heat the base board 16 and the electronic parts 65 mounted thereon, and then flow up through the air circulating channels 13U back to the air chamber 18 again.

The fin heater 14F has a very large total sectional area through which the air passes in contrast to the panel heater 14P. Therefore a large volume of air may flow through the fin heater 14F to rapidly heat the work. This is the reason why the fin heater 14F is employed in the heating device PH1 constituting the initial preheating zone of the preheating zone PHZ and in the heating device SH constituting the soldering zone SHZ for the purposes of rapidly preheating and rapidly fusing the cream solder. In this case, the temperature uniformity is a little inferior to that of the panel heater 14P. However the combined use of the two types of heaters 14P and 14F will realize a most desired heating effect in the reflow soldering apparatus 11 of the invention. The other effects of FIG. 8 are the same as those of FIG. 7 and therefore the further explanation is omitted.

In reference to FIG. 1, the reflow soldering processes will be described. When the electric motors 26,60 and the heaters 14 are turned on, the electric motors, the fans 12 and the conveyer 15 are driven respectively. The air in the air chambers 18 flows down through the air circulating channels 13D and through the heaters 14 as mentioned hereinbefore. The air is heated up with the heat exchange by means of the heaters.

In the preheating zone PHZ, the air is heated up to about 150° C. and contacts the base board 16 and the electronic parts 65 mounted thereon and then flows up through the air circulating channels 13U back to the air chambers 18.

Figure 10:
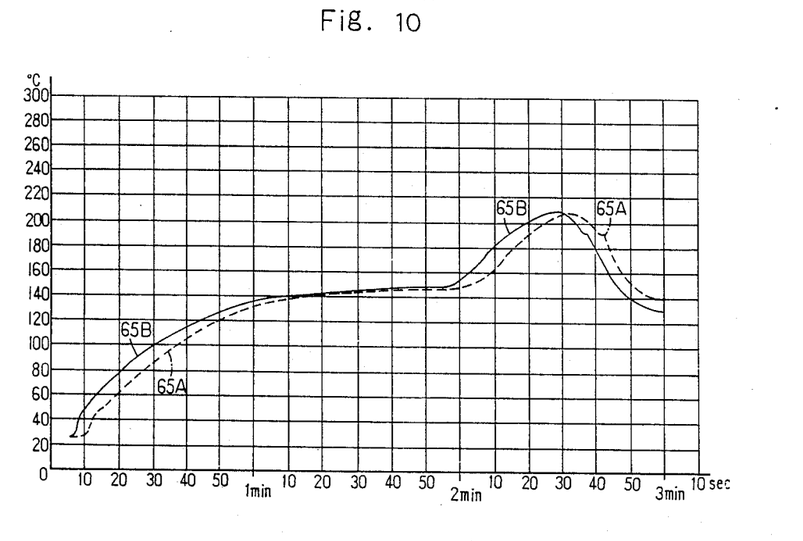
FIG. 10 is a graphical representation showing the temperature rise of electronic parts effected by the apparatus of the invention.

The base board 16 having the electronic parts 65 mounted thereon is transported into the heating device PH1 by the conveyer 15 and is rapidly heated by the heated air due to the effect of the fin heater 14F. In this case, the air flowing speed is about 3m/sec which will not move the electronic parts 65 which are attached to the base board 16 with a small force by means of the cream solder, and the base board and the electronic parts 65 are uniformly heated up in the manner as desired along the temperature curve as shown in FIG. 10. The base board 16 so heated up is further uniformly heated in the heating devices PH2 and PH3, and thus the preheating process is finished.

Since the heating devices PH1, PH2 and PH3 are independently formed, the heating temperature may be adjusted different in the respective heating devices. The base board 16 is progressively heated up by the air flow until the temperature of the base board is saturated with that of the flowing air and will never be above the air temperature. The temperature control is therefore very easy. The air temperature is always under the detection of the temperature sensor 45 and is incessantly transmitted to the computer so as to be maintained constant. The base board 16 is preheated up to about 150° C. in the heating devices PH2 and PH3, and the preheating process is finished.

The preheated base board 16 is subsequently transported into the soldering zone SHZ so as to be further heated by the air which is heated up to about 230° C. by the fin heater 14F. Then the cream solder is fixed to solder the electronic parts 65 to the base board 16 to thereby form electric circuits on the base board 16. It is to be noted again that the temperature of the base board 16 and the electronic parts 65 will never be above the temperature of the flowing air. Therefore an appropriate temperature control of the flowing air is sufficient for soldering the base board 16 because the work will never happen to be heated up to a temperature above a predetermined heating temperature. Therefore when soldering SMD or FIC chips and the like, the electronic parts 65 will never be damaged due to a high temperature, and the present method produces the same desirable results which may be obtained using the vapor phase method.

Further it has been found that the cooling property of the base board 16 after heating is far more superior to the vapor phase method. More precisely, when the base board 16 is transported out of the soldering zone SHZ, the base board 16 has no additional elements other than the air attached thereto, and therefore the base board is cooled down by the cooling fan 61 along a most desired curve.

Moreover according to the present invention, since poisonous liquids and the vapors thereof are not needed, the safety is secured and the soldering cost is lower.

In reference to FIG. 9 showing the base board 16 of 250mm long and 200mm wide having mounted thereon an electronic part 65A of a larger heat capacity and another electronic part 65B of a very small heat capacity, the test of temperature rise is as follows: Namely as shown in FIG. 10, the electronic part 65A is slower than the part 65B in the temperature rise for the first two minutes in the preheating process, but is progressively saturated in temperature with the temperature about 145° C. of the heated air and is then kept in balance. In the soldering zone SHZ, the part 65A is slower than the part 65B in the temperature rise. When the part 65A is transported out of the soldering zone SHZ after the soldering treatment has been finished, the part is rapidly cooled down by the cooling fan 61 just like in case of cooling down by way of the normally used far region infrared rays.

Whereas the part 65B of smaller heat capacity is faster than the part 65A in the temperature rise for the first two minutes as shown by the solid line in FIG. 10, but is progressively saturated in temperature with the temperature of the air and is then kept in balance. Thus the parts 65A and 65B have no temperature difference therebetween in the preheating process. The part 65B will reach the soldering temperature more rapidly than the part 65A in the soldering zone SHZ, but the highest soldering temperature is almost the same for both of the parts 65A and 65B, the difference being only about 2° C.

Further as shown in FIG. 10, the temperature of the parts 65A and 65B rises very gradually and progressively in the preheating process, and therefore the parts will have no heat shock which may otherwise damage the parts. The invention is properly making use of the advantages of the heater of far region infrared rays and of the vapor phase method to eliminate the disadvantages of prior art.

According to the invention, the heated air flows through the air circulating channels 13 and will not flow out of the heating device, and therefore the heat efficiency is very high and further the power consumption will never be more than that of the conventional device.

With respect to the drive mechanism 30, the motor 26, V-shaped belt 25, rotation shaft 19 and fan 12 are all placed below the heater 14 and conveyer 15, that is, the motion mass is concentrated to the underside of the reflow soldering apparatus, and therefore the vibrations and/or noises which may be produced from the mechanism 30 are considerably reduced when compared with the conventional apparatus. Further the heater 14 will give no adverse influence of heat to the electric motor 26 and bearings 20,21, endurance of which is considered essential. Further the total height H of the reflow soldering apparatus including the hood 39 placed at the top thereof may be considerably reduced, precisely by about 20cm, when compared with the conventional apparatus as shown in FIG. 11. In fact, the total height of the reflow soldering apparatus of the invention is less than 1.35m. Therefore, if the operator 6 of the apparatus 11 is small, for example, 1.55m tall, he is able to see the objects beyond the reflow soldering apparatus 11 in a factory. Namely the sight 6a of the operator 6 will not be interrupted by the apparatus 11 and he will be able to see the people working in the factory under a supervisory control as well as a safety control.

What we claim is:

1. A reflow soldering method for a base board to be soldered wherein air is circulated by a fan to flow through a heater so as to be heated and then come into contact with the base board having electronic parts mounted thereon and being transported by a conveyer relative to the heated air, said method comprising the steps of:
   (a) producing a minus pressure by means of a fan placed below said conveyer to cause the air to flow from up to down through a predetermined path;
   (b) causing the down flowing air to pass through the heater to heat up the air;
   (c) contacting the heated down flowing air to the base board as the base board is transported relative to the air; and
   (d) causing the heated air to flow from down to up to circulate the air relative to the heater and the base board.

2. The method as defined in claim 1, further comprising the step of: reducing the flowing speed of the air when the up flowing air comes to above the heater.

3. A reflow soldering apparatus for soldering a base board having electronic parts mounted thereon, wherein air is caused to flow, to be heated and to contact the base board which is transported by a conveyer, said apparatus comprising:
   (a) air flowing means including a fan provided below said conveyer and driven to cause the air to flow from up to down past said conveyer;
   (b) air heating means including a heater provided above said conveyer to heat the air when the air flows through said heater; and
   (c) air circulating means including a first air circulating channel for allowing the air to flow from up to down through said heater and past said base board as the base board is transported by said conveyer and at least one second air circulating channel which is conductive with said first air circulating channel and allows the air to flow from down to up to a level above said heater.

4. The apparatus as defined in claim 3, further comprising an air chamber located above said heater, said air chamber having a capacity for reducing the flowing speed of the air to stagnate the air therein.

5. The apparatus as defined in claim 4, wherein said heater is composed of a plurality of electric heater members arranged in parallel with each other with a predetermined space provided therebetween and a pair of metal plates of excellent heat conduction sandwiching said electric heater members from the upper and lower sides thereof, said metal plates having a plurality of vertical holes provided therethrough for allowing the air to flow through said holes to make a heat exchange.

6. The apparatus as defined in claim 5, wherein said metal plates are made of aluminum.

7. The apparatus as defined in claim 4, wherein said heater is composed of a plurality of electric heater members arranged in parallel with each other with a predetermined space provided therebetween, each of said electric heater members having a pair of metal plates of excellent heat conduction arranged thereagainst in a sandwiching manner from both sides thereof, each of said metal plates having a plurality of fins of excellent heat conduction provided on one side thereof with a predetermined space provided therebetween for allowing the air to flow through the heater from up to down.

8. The apparatus as defined in claim 3, comprising a plurality of air heating devices arranged in series, each of which is independent from the others and is composed of said fan, said first and second air circulating channels, said heater, said conveyer and said air chamber, at least one of said air heating devices being provided with a fin type heater to thereby constitute an initial zone for preheating said base board and at least one of said air heating devices being provided with another fin type heater to thereby constitute a zone for soldering said base board, the others of said air heating devices being provided with panel type heaters to constitute median and last zones for preheating said base board.

9. The apparatus as defined in claim 3, further comprising a driving device including an electric motor for driving said fan and a transmission mechanism arranged between said electric motor and said fan, said driving device being placed below said conveyer.

10. The apparatus as defined in claim 9, wherein said apparatus is designed to be less than 1.35m tall.

* * * * *